Patented Jan. 26, 1932

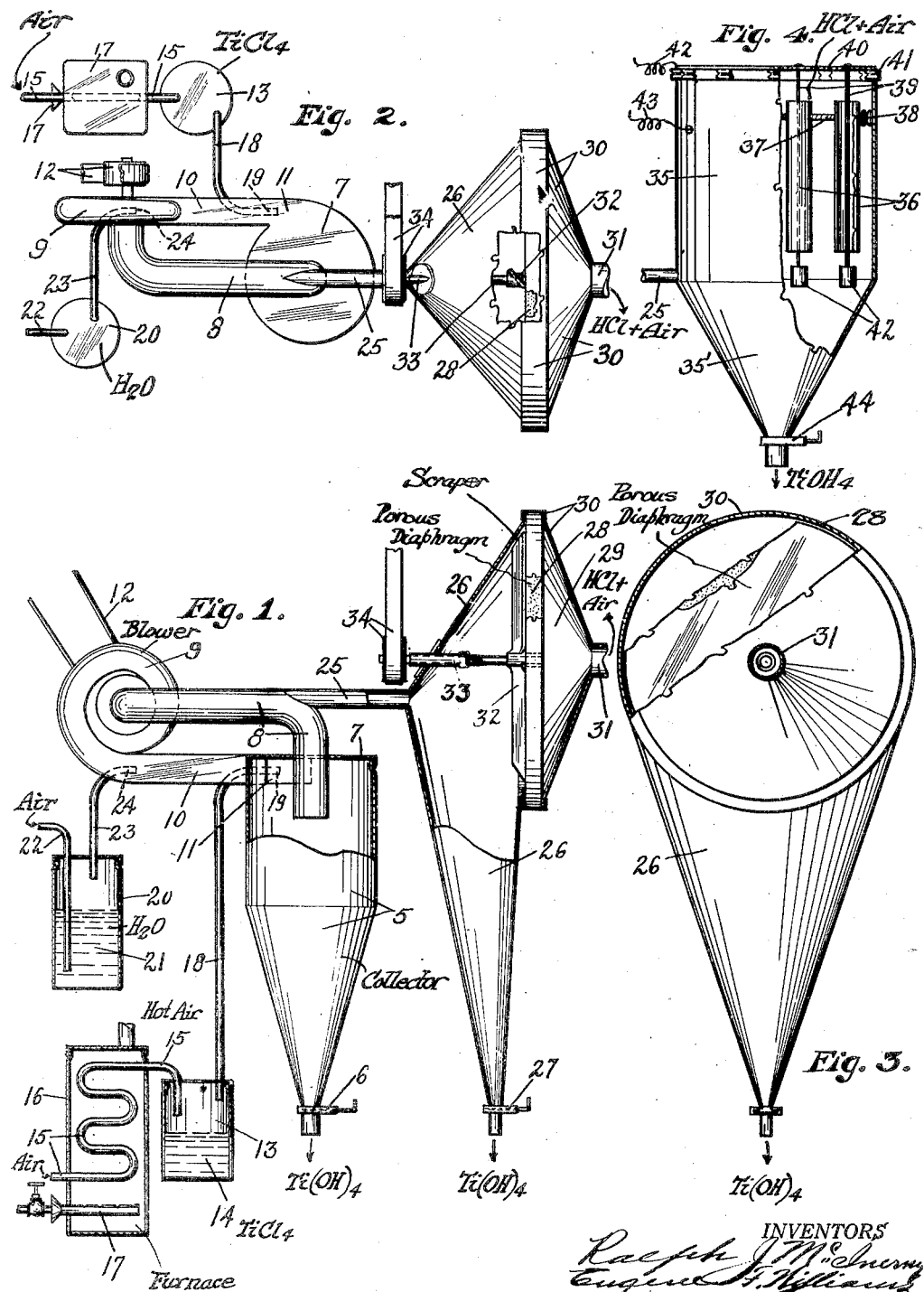

1,842,620

UNITED STATES PATENT OFFICE

RALPH J. McINERNY AND EUGENE F. WILLIAMS, OF LOS ANGELES, AND HERBERT L. GLAZE, OF SOUTH PASADENA, CALIFORNIA, ASSIGNORS, BY MESNE ASSIGNMENTS, TO MINERALS INCREMENT COMPANY, OF WILMINGTON, DELAWARE, A CORPORATION OF DELAWARE

METHOD OF MANUFACTURING TITANIC HYDROXIDE

Application filed March 19, 1928. Serial No. 262,653.

Various methods have been devised to manufacture titanic hydroxide and many patents have been issued for the various modifications of the known method of dissolving iron ores containing titanium or alloys of iron and titanium and the like in strong sulphuric acid, thus making a solution of titanium sulphate mixed with iron sulphate, and then recovering titanic hydroxide by diluting the sulphate solution and heating same to hydrolize the sulfate to hydroxide. But this method is costly on account of the greater dilution required to bring about the hydrolysis and on account of the difficulties experienced in filtering and washing the colloidal precipitate of titanic hydroxide.

The titanic hydroxide formed is very absorbent and it is almost impossible to remove the last traces of iron sulfate and sulfuric acid. Titanium dioxide produced by calcining the hydroxide is always of a cream color in place of pure white and it also has certain other undesirable characteristics when used as a pigment.

Another process involves the use of titanic chloride as a raw material for producing titanic hydroxide. In this process the titanic chloride is dissolved in water forming a mixture of titanic hydroxide and hydrochloric acid. Sulfuric acid is then added and the solution boiled, the hydrochloric acid is driven off and a residue of titanium dioxide and sulfuric acid is left behind which is then calcined to produce titanium dioxide. This process is hard to handle on account of the fact that all of the impurities originally contained in the titanic chloride, in the water used for dissolving same, and in the sulphuric acid, contribute to causing impurities in the resulting titanium dioxide.

The object of our process or method is to avoid all of the mentioned objections and difficulties and to produce a pure white product which can be converted into titanium dioxide of a very superior grade, pure white in color, very finely divided, and of far greater volume for a given weight.

In our new process we use titanic chloride as a raw material and we convert it into titanic hydroxide which can be used as such for some purposes such as the manufacture of various titanium salts and compounds, or, we can easily convert it into titanium dioxide by heating to drive off the combined water. Our entire process of converting from titanic chloride to titanic hydroxide is carried on in the vapor phase, thereby avoiding any of the impurities present in the water or in the titanic chloride liquid and excluding these impurities from the finished product.

In order to carry out our new process or method efficiently, we have worked out an apparatus suitable for the purpose, and in order to explain the invention more fully we have shown this particular apparatus on the accompanying sheet of drawings, which we will now describe.

Figure 1 is a side elevation, partly in section, showing a combination of mechanical elements cooperating in carrying out our process;

Figure 2 is a top plan view thereof;

Figure 3 is an elevation looking at the right hand portion of Fig. 1, with parts broken away; and Figure 4 is an elevation, partly in section, of a known precipitator which can be utilized in connection with our process instead of that shown in Fig. 3, if desired.

Referring in detail to the drawings, 5 designates a collector having a tapering bottom and gate 6, and a closed upper end 7, through which a suction pipe 8, from a blower 9, discharges, the discharge pipe 10, of said blower discharging tangentially into said collector, as at 11. Said blower 9, is driven by means of belt and pulley 12, from any suitable source of power. This sets up a circulation within said collector. One method of forcing vaporized titanic chloride into said collector 5, is to provide a receptacle 13, for said titanic chloride 14, and into which is forced dry hot air through a pipe 15, in a furnace 16, heated by gas burner 17, and connecting said receptacle 13, through a pipe 18, into the discharge pipe 10, from the blower 9, near the juncture of said discharge pipe with said collector, as at 19. Said hot air vaporizes the titanic chloride and this vapor is discharged into the collector through pipe 18. Another receptacle 20 is provided with water 21, into which is discharged warm air through pipe 22, which percolates upwardly through said water 21, thus vaporizing the water which passes out through pipe 23, which connects with said discharge pipe 10, from the blower, as at 24. The water vapor and air from pipe 23, hydrolizes the titanic chloride vapor from pipe 18, and the titanic hydroxide is deposited as a fine powder in dust collector 5, from which it is drawn through the gate 6. The blower 9, circulates the gaseous contents of said collector 5, by reason of the tangential connection of its discharge pipe 10 therewith.

Excess air and hydrochloric acid gas released from the titanic chloride by water according to the following equation:

$$TiCl_4 + 4H_2O = Ti(OH)_4 + 4HCl,$$

passes through a pipe into the collector 26, somewhat similar to collector 5, with a gate 27. Said pipe is designated 25, and branches off from the pipe 8, to said collector 26, and carries some titanic hydroxide dust. Hydrochloric acid gas and air passes through a porous diaphragm 28, into a chamber 29, in the housing 30, said collector 26 and said housing 30, in which is the chamber 29, being all enclosed and sealed, with the porous member or diaphragm 28 therebetween. From the chamber 29, said hydrochloric acid gas and air passes out through pipe 31, to waste, or to an apparatus for recovering the hydrochloric acid. The dust of titanic hydroxide collects on the porous plate or diaphragm 28, from which it is removed by a revolving scraper 32, on a shaft 33, extended out through the collector wall 26. Dust removed by said scraper 32 falls into the lower part of the collector 26, from which it can be removed through the gate 27.

As another method for removing the gas passing out through the pipe 25, is to use a precipitator, such as that known as Cottrell precipitator, and illustrated in Fig. 4, and comprising a body or housing 35, with a series of tubes 36, supported in a member 37, insulated, as at 38, from said body 35. Wires 39, suspended from a member 40, also insulated, as at 41, from said body, extend down through said tubes 36, with weights 42 thereon, said weights holding said wires centrally positioned within said tubes. Electric wires, 42 and 43, connect, respectively, with said members 40, and 37, and these lead to any suitable source for supplying unidirectional electric current at high voltage, which is impressed upon the tubes 36 and the wires 39, and as the dust laden gases pass up through said tubes 36, from the feed or supply pipe 25, they are ionized in said pipes, causing the dust to be driven to the walls of said tubes or pipes 36, down which it slides into the hopper portion 35' of said body 35, from which it can be removed through the gate 44.

While we have shown these two forms of apparatus for carrying out our process or method, it is to be understood that any suitable apparatus in which gaseous titanic chloride can be mixed with water vapor and in which hydrolysis can be carried out in the gaseous state or phase, and in which the titanic hydroxide resulting can be separated from the resulting hydrochloric acid gas, can be used. Nor are we limited to the use of air to carry the water vapor into the apparatus, as steam to accomplish the purpose of hydrolyzing the titanic chloride vapor can be used. Nor are we limited to the use of air to carry the titanic chloride vapor into the apparatus, as we can heat the titanic chloride liquid in a suitable tank and generate vapor pressure of pure titanic chloride sufficiently to carry the titanic chloride vapor into the apparatus. We can also vary our process so as to use water in the form of a very fine spray or mist and we can hydrolyze the titanic chloride vapor with this spray or mist, and can use the titanic chloride liquid as a spray or mist in conjunction with water in the form of either spray or mist or in the form of vapor or in the form of steam.

While we prefer an apparatus similar to that here shown as one suitable and practical apparatus for carrying out the new method or process, we are aware that many changes can be made within the scope of the invention and we do not, therefore, limit our invention to the showing made for illustrative purposes, except as we may be limited by the hereto appended claims.

We claim:

1. The process of manufacturing titanic hydroxide which consists in reducing titanic chloride to vapor form by forcing hot dry air therethrough and mixing water vapor therewith in a closed container, gathering excess air and hydrochloric acid gas released therefrom into a collector and passing the same through a filter to separate the titanic hydroxide therefrom in the form of dust.

2. The herein described process of manufacturing titanic hydroxide which consists in forcing hot dry air through a quantity of titanic chloride and discharging the vapor into a collector, forcing a water vapor into said collector and mixing the same within said collector, whereby the water vapor hydrolyzes the titanic chloride vapor, filtering the mixture by forcing it through a filter and collecting from said filter in the form of fine powder titanic hydroxide.

3. The herein described process of hydrolyzing one vapor by another vapor, one of said vapors being water vapor; which consists in forcing said vapors into a closed collector, mixing the same with a blowing process to cause circulation of said mixture, and forcing said mixture of vapors through a porous filter, whereby the hydrolyzed product is collected in the form of fine powder on one side of said filter, while the other vapors pass through said filter to the opposite side thereof.

4. The herein described process for manufacturing hydroxides which consists in reducing the chloride to vapor form and discharging it under force into a collector, discharging a water vapor into said collector, said collector being closed and said vapors being discharged tangentially thereinto to produce a forced circulating action within said collector, whereby to precipitate the solids from the vapor mixture, and drawing off the remaining vapors from the center while maintaining a closed condition for said process.

Signed at Los Angeles, Los Angeles County, California, this 9th day of March, 1928.

RALPH J. McINERNY.
EUGENE F. WILLIAMS.
HERBERT L. GLAZE.